Feb. 16, 1960
J. W. BROOKSHIER
2,925,199
PIERCING AND TAPPING DEVICE FOR FLUID
FILLED FILM CONTAINERS
Filed April 18, 1956
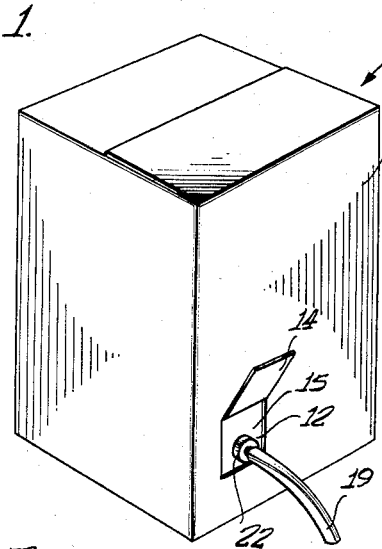
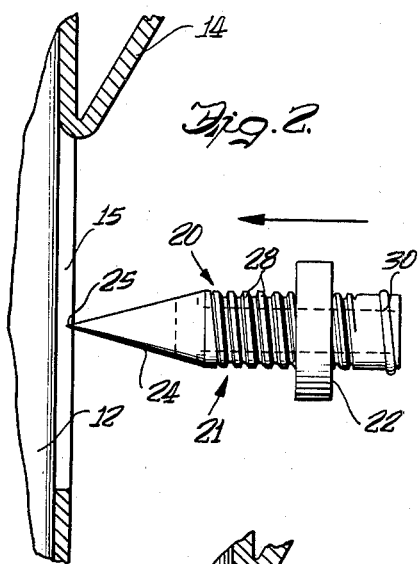
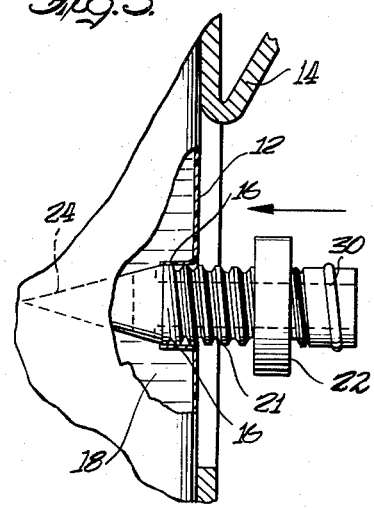
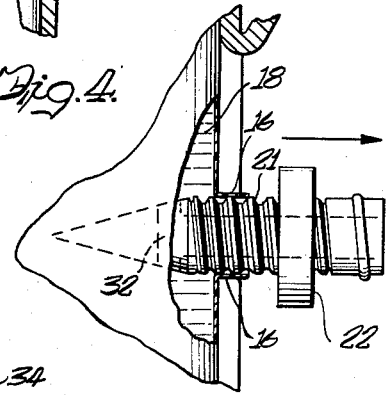
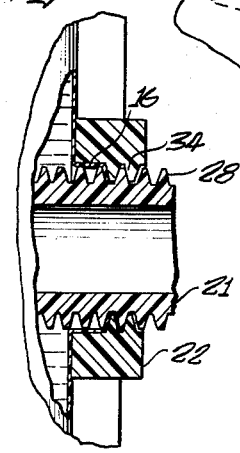
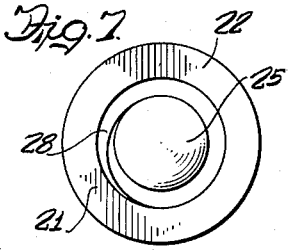
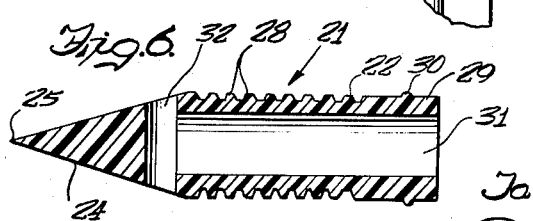
Inventor
James W. Brookshier
Jack D. Dominik
Attorney

United States Patent Office 2,925,199
Patented Feb. 16, 1960

2,925,199

PIERCING AND TAPPING DEVICE FOR FLUID FILLED FILM CONTAINERS

James W. Brookshier, Decatur, Ill., assignor to B-Line Dispensers, Inc., Decatur, Ill.

Application April 18, 1956, Serial No. 579,012

2 Claims. (Cl. 222—91)

The present invention relates to the dispensing of fluids from plastic film containers. It finds particular, although not necessarily exclusive, utility in tapping liquid foodstuffs, such as milk, ice cream mixes, concentrates and the like from within sanitarily sealed plastic film containers. The plastic film containers may be housed in a rigid enclosure such as a corrugated box which protects the film container as well as facilitating shipping and handling of the plastic film bags.

Liquid foods, such as outlined above, have been transported and stored in metal and glass containers for many years. The handling costs attendant to the use of such containers has forced the development of disposable lighter weight containers, usually made from paper derivatives. The paper containers, however, suffer from size limitations and a lack of adequate pouring or dispensing facilities. As the units become progressively larger, they invariably become much more difficult to handle and require auxiliary dispensing equipment. Such dispensing equipment, as well as the containers, often run afoul of health and pure food regulations.

With the foregoing in mind, it is the general object of the present invention to provide a sanitary and inexpensive way for dispensing liquids from plastic film bags housed within corrugated or other rigid disposable containers.

Another object of the invention is to furnish a liquid container and dispenser which minimizes the amount of material required for both the container and the dispenser for a given quantity of liquid.

Further objects and advantages of the present invention will become apparent as the following description of an illustrative embodiment proceeds, taken in conjunction with the accompanying illustrative drawings in which:

Figure 1 illustrates in perspective view a typical container dispensing fluid with a mechanism illustrative of the invention.

Fig. 2 is an enlarged partial sectional view in front elevation illustrating the first step in the sequence of tapping a container with a piercing tap illustrative of the invention.

Fig. 3 is a view of the same element shown in Fig. 2 except that the piercing tap has already pierced and penetrated the plastic bag.

Fig. 4 shows the next step after that shown in Fig. 3 where the piercing tap is being withdrawn from the plastic film container.

Fig. 5 shows an enlarged partial section showing the piercing tap after it has been locked in place for dispensing fluid.

Fig. 6 is a cross section in front elevation of the piercing tap.

Fig. 7 is an end assembled view of the piercing tap and locking nut.

For its environment, the present invention requires a liquid to be packaged in a plastic film container, such as a polyethylene bag. Since it is impractical to transport such fluid filled polyethylene or other film bags, they are housed in containers, usually of the disposable variety formed from corrugated board. Such a unit is shown in Fig. 1 where it will be seen that the fluid package 10 is made up of an outer container 11 and an inside bag 12 formed of a flexible plastic. In order to ready the inside film bag 12 for tapping, a tear flap 14 is provided on the outside of the carton 11 which exposes a tapping area 15.

The unique tapping device 20 contemplates only two elements, a piercing tap 21 and a lock nut 22. Before outlining the details of construction of the tap, a review of the operation of the unit will be helpful in appreciating the precise construction.

When the user first receives the container 10, he tears open the flap 14 exposing the open piercing area 15. The piercing tap is then poised in position to penetrate the film bag 12 as illustrated in Fig. 2. The piercing tap is then thrust forward sharply until it penetrates the film of the bag 12 as illustrated in Fig. 3. The portion of the film 16 which is torn is thrust inwardly, and the weight of the fluid 18 pressing down upon the flaps 16 and holding them in sealed relationship with the piercing tap 21. Then, as illustrated in Fig. 4, the piercing tap 21 is withdrawn from the bag 12 and the film flaps 16 are reversed in their contact relationship with the piercing tap 21. Thereafter, the locking nut is threaded forwardly against the film flaps 16 thereby sealingly jamming the film at the interface between the threaded elements of the locking nut 22 and piercing tap 21.

Subsequently a drain tube 19 may be threaded to the outer portion of the piercing tap 21, and the contents of the container 10 drained in a conventional manner.

The details of the piercing tap 21 are best illustrated in Fig. 6. There it will be seen that the piercing tap has a pointed nose portion 24 which terminates in a sharp point 25. Along the cylindrical body portion of the piercing tap 21 are a plurality of threads 28, a modified square thread being shown in the present instance. The pointed nose portion 24 may be affixed to the end of the threaded piercing tap after the locking nut 22 has been threaded onto the body portion, or it may be formed integrally with the body portion in which case the threads 28 permit the locking nut to be threaded from the pointed end of the piercing tap. However, in either case, the portion of the body between the locking nut in its position on the threaded body most remote from the pointed end is free of any structure which projects outwardly beyond the major diameter of the threads formed on the cylindrical body to prevent over-enlargement of the puncture produced in the wall 12. The rear cylindrical portion 29 of the piercing tap has a single rounded thread 30 which threadingly engages the inner portion of the drain tube 19. A hollow bore 31 extends through the main body portion of the piercing tap portion 21, and is fed by a transverse cross head bore 32. As will be seen in Fig. 4, the cross head bore 32 is fed by fluid 18 and then the fluid drains through the hollow central portion 31 of the piercing tap 21. Various alternative channel relationships are contemplated, but fall within the spirit of the invention when they serve the purpose of draining the fluid from the film bag. The locking nut 22 is annular in shape, and threaded with internal threads 34 proportioned to mate with piercing taps 28 as shown best in Fig. 5. It will be noted that the relationship between the locking nut threads 34 and the piercing tap threads 28 must provide sufficient play so that the flap portion 16 of the plastic film container 12 may be jammingly engaged between opposed portions of the faces of the respective threads of the locking nut 22 and piercing tap 21.

The construction of the piercing tap and locking nut are such that the drain tube 19 may be threaded in place over the smooth body portion 29 of the piercing tap 21 and held in place by the single thread 30 thereon. Then the operator can pierce the plastic film bag 12 by holding the outer portion of the drain tube 19 in one hand and the locking nut 22 in the other, it not being necessary to touch the piercing point 24 or any other portion of the piercing tap 21 which comes in contact with the fluid 18. After the piercing tap has been withdrawn to the station as shown in Fig. 4, the locking nut 22 is threaded down into place jammingly sealing the film flap 16 to the tapping assembly. Although the operator's hands may grasp the outer portion of the locking nut 22, there still is no contact with the fluid which is thereafter dispensed through the pointed piercing head 24 and hollow central portion 31 and thereafter into the drain tube 19. The foregoing structural description will be more fully understood in the light of the action which takes place when the plastic film container is pierced. The piercing head 24 is thrust through the film 12 as shown sequentially in Figs. 2 and 3. This ruptures the film, creating a resultant hole somewhat smaller than the actual size necessary to admit the insertion of the body portion 21. Since the plastic film has no "grain" the size of the hole does not enlarge. On the contrary, the size of the hole tends to remain smaller than the root diameter of the threaded body portion of the tapping device. This seeming paradox is attributable to the inherent elasticity of the plastic membrane 12. As the device is thrust inwardly, a small flap portion 16 is developed, but due to the contraction of the film portion, it effects temporary seal with the threads.

The purpose of the insertion beyond the point necessary is to insure that the plastic film is disposed in a tubular form around the external threads of the body. Then, when the tapping device is purposely partially withdrawn, the film flap, still adhering to the threads, reverses and assumes a tubular form on the outside of the external threads of the body. The film flap 16 then becomes an obstruction to the threading of the locking nut 22 as shown in Fig. 4. The clearance provided between the interfaces of the nut threads 34 and the body threads 28, is such as to permit the mating of the thread interfaces while simultaneously locking the film flap 16 between the threads. Each thread thereby becomes a seal.

Although the container 10 illustrated has been tapped from a side portion, it will be appreciated that it can be tapped from any face. In addition, it is possible to drop a plastic film bag into a metal container, the bottom of which is formed to accommodate the piercing tap contemplated by the invention.

By employing the unique mechanism for draining fluid-filled containers, the containers may be housed in a cooler and the tapping drain hose extended to drain the contents to a remote location. In large dairies, ice cream factories, restaurants, and many other establishments, the technique for tapping fluids will make possible extensive savings in packaging and handling costs, while at the same time ensuring adequate sanitary precautions in the handling of fluid foods.

Although particular embodiments of the invention have been shown and described in full here, there is no intention to thereby limit the invention to the details of such embodiments. On the contrary, the intention is to cover all modifications, alternative embodiments, usages and equivalents of the piercing and tapping device for fluid filled film containers as fall within the spirit and scope of the invention, specification, and appended claims.

I claim as my invention:

1. A piercing and tapping device for drawing off a fluid from within a plastic film container comprising an elongated body having a passage formed longitudinally therethrough, a tapered head terminating in a relatively sharp point at one end of the elongated body, said elongated body including a cylindrical portion adjacent said tapered head, threads formed on said cylindrical portion, and a closure element having a threaded hole therethrough which is free of threads at the end nearest the tapered head, the closure element being loosely threaded on said threaded portion of the body so as to provide a clearance between the closure element and the body while still maintaining a threaded coupling therebetween, the major diameter of the threaded portion of the body being the largest diameter of the piercing and tapping device between the pointed end and the closure element in its position most remote from the pointed end, the pointed end of the piercing and tapping device serving to puncture and penetrate the plastic film container when thrust therethrough, the portion of the plastic film container surrounding the threaded portion of the body forming an internal neck within the container which frictionally engages the said threaded portion, so that when the piercing and tapping device is partially withdrawn, the internal neck is reversed, forming an external neck surrounding the said threaded portion, the threadless end of the hole of the closure element facilitating the threading of the closure element onto the external neck of the container, the mating threads of the body and the closure element being proportioned to form a tight fitting engagement when the neck is interposed therebetween to establish a seal between the underfaces of the closure element and the threaded body.

2. A piercing and tapping device for drawing off a fluid from within a plastic film container comprising an elongated body having a passage formed longitudinally therethrough, a tapered head terminating in a relatively sharp point at one end of the elongated body, said elongated body including a cylindrical portion adjacent said tapered head, threads formed on said cylindrical portion, and a closure element having a threaded hole therethrough which is enlarged at the end nearest the tapered head, the threads adjacent the enlarged portion of the hole being loose fitting with the threads formed on the body so as to provide a clearance between the closure element and the body while still maintaining a threaded coupling therebetween, the major diameter of the threaded portion of the body being the largest diameter of the piercing and tapping device between the pointed end and the closure element in its position most remote from the pointed end, the pointed end of the piercing and tapping device serving to puncture and penetrate the plastic film container when thrust therethrough, the portion of the plastic film container surrounding the threaded portion of the body forming an internal neck within the container which frictionally engages the said threaded portion, so that when the piercing and tapping device is partially withdrawn, the internal neck is reversed, forming an external neck surrounding the said threaded portion, the enlarged end of the hole of the closure element assisting in feeding the external neck of the container between the loosely mating threads of the closure element and the body, the mating threads of the body and the closure element being proportioned to form a tight fitting engagement when the neck is interposed therebetween to establish a seal between the underfaces of the closure element and the threaded body.

References Cited in the file of this patent

UNITED STATES PATENTS

| | | |
|---|---|---|
| 105,818 | Lord | July 26, 1870 |
| 477,308 | McFarland | June 21, 1892 |
| 1,618,720 | Moore | Feb. 22, 1927 |
| 2,758,747 | Stevens | Aug. 14, 1956 |